(12) United States Patent
Picard et al.

(10) Patent No.: US 7,550,980 B2
(45) Date of Patent: Jun. 23, 2009

(54) SYSTEM AND METHOD FOR CHARACTERIZING A LOAD AT THE END OF A CABLE

(75) Inventors: Jean Picard, Hooksett, NH (US); Lin Wang, Merrimack, NH (US); Wilburn M. Miller, Wilton, NH (US); Robert A. Neidorff, Bedford, NH (US); Guillermo J. Serrano, Coto Laurel, PR (US)

(73) Assignee: Texas Instruments Incorporated, Dallas, TX (US)

( * ) Notice: Subject to any disclaimer, the term of this patent is extended or adjusted under 35 U.S.C. 154(b) by 174 days.

(21) Appl. No.: 11/888,467

(22) Filed: Aug. 1, 2007

(65) Prior Publication Data

US 2009/0033345 A1 Feb. 5, 2009

(51) Int. Cl.
*G01R 27/08* (2006.01)
*H02H 3/20* (2006.01)
(52) U.S. Cl. .................. 324/705; 324/691; 361/91.2
(58) Field of Classification Search .............. 324/705; 361/91.2
See application file for complete search history.

(56) References Cited

U.S. PATENT DOCUMENTS

| | | | | |
|---|---|---|---|---|
| 5,844,759 | A | * | 12/1998 | Hirsh et al. .................. 361/42 |
| 6,753,687 | B2 | * | 6/2004 | Nitta et al. .................. 324/548 |
| 2006/0017444 | A1 | * | 1/2006 | Fechalos et al. ............. 324/433 |
| 2008/0049367 | A1 | * | 2/2008 | Carson et al. ................ 361/87 |
| 2008/0291039 | A1 | * | 11/2008 | Picard ......................... 340/652 |

OTHER PUBLICATIONS

Silicon Laboratories, Inc., Si3400/01 Power Over Ethernet PD Controllers, 2007.
National Semiconductor Corporation, LM5071—Power Over Ethernet PD Controller With Auxiliary Power Interface, 2007.
EeProductCenter, Power-Over-Ethernet Controller Extends the IEEE Spec, Apr. 10, 2007.
ThomasNet Industrial NewsRoom, News Story—PoE Controller Suits High Powered Device Applications, Apr. 11, 2007.
National Semiconductor Corporation, Introduces Industry's First Single-Chip, Power Over Ethernet Device Controller Designed for Low-Voltage Auxillary Power Sources, Jan. 16, 2006.

(Continued)

*Primary Examiner*—Diego Gutierrez
*Assistant Examiner*—Jeff Natalini
(74) *Attorney, Agent, or Firm*—John J. Patti; Wade J. Brady, III; Frederick J. Telecky, Jr.

(57) ABSTRACT

Apparatus within power sourcing equipment and a method for determining whether a load within a powered device coupled to the power sourcing equipment via a cable is within an acceptable resistance range. If the load is within the acceptable resistance range, a voltage source is coupled to the load. In one embodiment one recharge interval is employed during which a capacitor is charged based, at least in part, on the voltage drop across the load and one discharge interval is employed during which a capacitor is discharged based, at least in part, on the voltage drop across the load. In a second embodiment, first and second recharge and discharge intervals are employed and prior to initiation of the recharge and discharge intervals, settling time periods are provided.

31 Claims, 5 Drawing Sheets

OTHER PUBLICATIONS

Embedded Star (Online Destiny Ltd.), TI Introduces New Controller IC and Plug-In Power Module, May 18, 2004.

Texas Instruments Incorporated; IEEE 802.3af Power Interface Switch for Power Over Ethernet (PoE) Powered Devices, Aug. 2002—revised Mar. 2004.

Texas Instruments Incorporated, Reference Design, TPS23750 High Efficiency 5V at 2.2A PoE PD, SLVU159—Feb. 2007.

Power Electronics Technology, David Morrison, Power Over Ethernet Nurtures a New Class of Controller Chips, May 1, 2004.

* cited by examiner

SYSTEM AND METHOD FOR CHARACTERIZING A LOAD AT THE END OF A CABLE

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates to techniques for delivering power over a data communications cable, such as a category 5 cable or equivalent, and more particularly, to a system and method for characterizing a load at the end of a communication cable prior to delivering power to the load.

In Power over Ethernet (PoE) systems, it is desirable to determine the resistance of a load within a powered device (PD) that is powered by power sourcing equipment (PSE) to ascertain whether the PSE should apply power to the load. This determination can be complicated for a number of reasons. First, a communications cable coupling the PSE to the PD may be coupled directly to the load or alternatively, may be coupled to the load via a diode rectifier or a diode bridge. Moreover, if the load is shunted by a large capacitance, a DC measurement may be distorted since the voltage across the shunt capacitance may not stabilize prior to completion of the measurement. Additionally, as the resistive load is typically within the PD at the end of the communication cable, which may extend a considerable distance, the load measurement is susceptible to noise pickup from the cable.

The need to determine whether a PD includes a load which can be powered is becoming more and more widespread as an increasing number of PDs are deployed using PoE. It would therefore be desirable to have a system and method which allows characterization of a load within a PD in a manner which is reliable and inexpensive so as not to burden the product costs of PSE equipment.

BRIEF SUMMARY OF THE INVENTION

A method and system of determining whether the resistance of a load in a PD is in an acceptable range is disclosed. The PD is employed in a system, such as a PoE system, in which the power is supplied by PSE over a cable which typically also carries signaling data. In accordance with one embodiment of the present invention, the PSE includes at least one current source for delivering at least first and second currents to the PD over a communications cable, such as an Ethernet cable, and for measuring the resulting voltage drops at the PSE produced as a consequence of the passage of the respective currents through the load.

More specifically, in one embodiment of the invention, a first test current, generated by at least one current source in the PSE, is conveyed through an output port of the PSE to the load within the PD via the communications cable. The first test current produces an output voltage at the output port of the PSE. The observed voltage drop at the PSE output port results from the voltage drop through only the load, if the load within the PD is connected directly to the communications cable or alternatively, the voltage drop observed at the PSE may be the sum of the voltage drops through series diodes plus the voltage drop across the load. An integration capacitor $C_{int}$ in the PSE is initialized to a predetermined starting voltage $V_0$. The voltage at the output port of the PSE is coupled to a voltage to current converter which generates a first recharge current. The first recharge current is proportional to the output port voltage by a proportionality factor (f). The first recharge current is employed to charge the capacitor $C_{int}$ in the PSE from the predetermined starting voltage $V_0$ for a recharge interval $R_a$ of predetermined length. The capacitor $C_{int}$ is charged during the recharge interval $R_a$ to a intermediate voltage $V_1$ that depends in part on the value of the load resistance within the PD.

Following the recharge interval $R_a$, a second test current, which differs from the first test current, is applied to the communication cable. The second test current may be generated by a second current source, via use of a voltage or current controlled current source, or via any other suitable technique. The voltage on the output port of the PSE produced by the passage of the second test current through the PD, including the load, is applied to the voltage to current converter to generate a discharge current that is used to de-integrate the capacitor $C_{int}$ from the intermediate voltage. The discharge current is proportional to the output port voltage by the proportionally factor (f). The capacitor $C_{int}$ is discharged for the discharge interval $D_a$ to a final voltage $V_f$. The durations of the recharge and discharge intervals $R_a$ and $D_a$ are equal in length, however, the recharge and discharge currents applied to the capacitor $C_{int}$ during the recharge and discharge intervals are different. After the time period $D_a$, the voltage $V_f$ on the capacitor $C_{int}$ is tested to determine if the voltage is between predetermined upper and lower thresholds. If the voltage $V_f$ on the capacitor $C_{int}$ indicates that the load resistance is within a predefined acceptable resistance range as specified by the upper and lower thresholds, power is applied to the PD. If the voltage $V_f$ on the capacitor $C_{int}$ is not within the predefined acceptable resistance range, the PD is left un-powered and the test is subsequently repeated. By charging and discharging the capacitor $C_{int}$ as described above, a determination may be made whether the load resistance is within a specified acceptable range and the effects of diodes connected in series with the load in the PD may be substantially eliminated. Additionally, by setting the recharge and discharge intervals of sufficient length, the effects of PD capacitance (within limits) shunting the load and line noise may be substantially eliminated. The same concepts described above can be implemented by applying voltages to the output port, sensing port current and recharging and discharging the capacitor based on the magnitude of the sensed port current.

Another embodiment of the invention employs a first phase having first and second time periods and a second phase having third and fourth time periods. Each phase includes a recharge interval during which a capacitor $C_{int}$ in the PSE is charged and a discharge interval during which the capacitor $C_{int}$ in the PSE is discharged. The voltage on the capacitor $C_{int}$ is initialized to a predetermined starting voltage $V_0$ prior to the phase one recharge interval. In the first time period a first test current is applied to the PD through the output port of the PSE. After a first settling period $X_1$ within the first time period, the capacitor $C_{int}$ in the PSE is charged from the predetermined starting voltage $V_0$ for a first recharge interval $R_1$. The recharge current during the recharge interval $R_1$ is generated by a voltage to current converter. The current produced by the voltage to current converter is proportional to the voltage on the PSE output port by a proportionally factor (f). At the conclusion of the first recharge interval $R_1$, the voltage on the capacitor $C_{int}$ is a first intermediate voltage $V_1$ which is dependent in part on the value of the load resistance within the PD plus voltage drops across any diode in the PD connected in series with the load $R_L$.

After the integration of the capacitor $C_{int}$ during the first recharge interval $R_1$, in the second time period, a second test current, which is less than the first current, is coupled to the communication cable through the output port of the PSE so as to produce a voltage drop across the load and any series connected diodes within the load. The voltage to current converter generates a first discharge current which is proportional to the voltage on the output port of the PSE. The same proportionally factor (f) is used to generate the first discharge current as is applied to generate the first recharge current. After a settling period $X_2$, the capacitor $C_{int}$ in the PSE is discharged from the first intermediate voltage $V_1$ during a first discharge interval $D_1$ within the second time period.

In addition to the first discharge current, during the first discharge interval $D_1$ the capacitor $C_{int}$ is also discharged with a phase one offset current generated by a phase one offset current generator. The phase one offset current is specified to cause the capacitor $C_{int}$ to discharge to the starting voltage $V_0$ on the capacitor $C_{int}$ (e.g. the voltage immediately prior to the first recharge interval $R_1$) when the load resistance corresponds to a minimum acceptable load resistance (e.g. 17K). Following the first discharge interval $D_1$, the voltage on the capacitor $C_{int}$ equals a first final voltage $V_{1f}$. The first final voltage $V_{1f}$ on the capacitor $C_{int}$ is then tested. If the first final voltage on the capacitor $C_{int}$ is less than the initial voltage $V_0$ on the capacitor $V_0$, such indicates that the resistance of the load is less than the minimum acceptable load resistance (e.g. 17K).

Following completion of the phase one recharge and discharge intervals, $R_1$ and $D_1$ respectively, the system cycles through phase two which includes time periods three and four and recharge and discharge intervals, $R_2$ and $D_2$ respectively. During phase two, the apparatus determines whether the load resistance is greater than the maximum acceptable load resistance.

The capacitor $C_{int}$ is initialized to a predetermined starting voltage which may be the starting voltage $V_0$. During the third time period, a third test current is applied to the output port. The third test current is typically equal to the first test current and may be produced by the same current source as used to generate the first test current. The application of the third test current to the PD via the communication cable produces a voltage drop across the load and any series connected diodes. The voltage to current converter produces a second recharge current during the third time period. The second recharge current is proportional to the voltage on the PSE output port by the proportionality factor (f). After a settling time $X_3$, the capacitor $C_{int}$ is charged from the predetermined starting voltage with the second recharge current for a second recharge interval $R_2$. Following the recharge interval $R_2$, the voltage on the capacitor $C_{int}$ equals a second intermediate voltage $V_2$.

In the illustrated embodiment, after the second recharge interval $R_2$, during the fourth time period, a fourth test current that is smaller in magnitude than the third test current is applied to the output port of the PSE. The fourth test current typically has the same magnitude as the second test current. The application of the third test current to the PD via the communication cable produces a voltage drop across the load and any series connected diodes. The voltage to current converter produces a second discharge current during the fourth time period. The second discharge current is proportional to the voltage on the PSE output port by the proportionality factor (f). Following a settling time $X_4$ in the fourth time period, the capacitor $C_{int}$ is discharged from the second intermediate voltage $V_2$ during a second discharge interval $D_2$ with the second discharge current and a phase two offset current produced by a phase two offset current generator. The phase two offset current is specified to cause the capacitor $C_{int}$ to discharge to the starting voltage on the capacitor $C_{int}$ (e.g. immediately prior to second recharge interval $R_2$) when the load resistance corresponds to the maximum acceptable load resistance (e.g. 29K). The second discharge interval $D_2$ is equal in length to the second recharge interval $R_2$. Following the second discharge interval $D_2$, the voltage on the capacitor $C_{int}$ equals a second final voltage $V_{2f}$. The second final voltage $V_{2f}$ is tested to determine if it is greater than the starting voltage present on the capacitor $C_{int}$ immediately prior to the phase two recharge interval $R_2$. If the second final voltage $V_{2f}$ is determined to be greater than the starting voltage just prior to the second recharge interval, such is indicative that the resistance of the load is greater than the maximum acceptable resistance. Assuming that it is determined that the load resistance is less than the minimum acceptable load resistance or greater than the maximum acceptable load resistance, power is not applied to the PD by the PSE and the aforementioned test is repeated after a predetermined interval. If it is determined that the load resistance is between the minimum and maximum acceptable resistances, a signal is generated that indicates that the resistance of the PD is within an acceptable range and a power source within the PSE is coupled to the load via the communications cable.

Other features, functions and aspects of the invention will be evident from the Detailed Description of the Invention that follows.

BRIEF DESCRIPTION OF THE SEVERAL VIEWS OF THE DRAWINGS

The invention will be more fully understood by reference to the following Detailed Description of the Invention in conjunction with the drawings, of which.

DETAILED DESCRIPTION OF THE INVENTION

Figure 1:
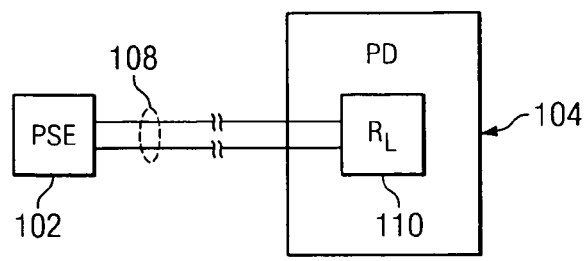
FIG. 1 is a block diagram of a system operative in accordance with the present invention.

A system and method in accordance with the present invention are disclosed for determining within a PSE whether a load within a PD that is coupled to the PSE via a communications cable is within a predetermined acceptable range of resistance. A system 100 operative in accordance with the present invention is generally illustrated in FIG. 1. Referring to FIG. 1 the system 100 includes a PSE 102 coupled to a PD 104 via a communication cable 108. The PSE 102 provides power to the PD 104 over the cable 108. Prior to applying power to the cable 108, the PSE 102 performs a test to determine if the resistance of a load $R_L$ 110 coupled to the cable 108 (either directly or via series connected diodes) is within an acceptable range of resistances. For example, in accordance with the Power Over Ethernet (PoE) standard IEEE 802.3af dated April 2004, which is incorporated herein by reference, the load $R_L$ 110 is deemed to be acceptable if within a range between 17,000 ohms and 29,000 ohms. If the PSE 102 determines that the resistance of the load 110 is less than a minimum acceptable resistance or greater than a maximum acceptable resistance, the PSE 102 does not apply power to the load $R_L$ 110. The PSE 102 periodically tests the load $R_L$ 110 to determine if the load 110 has a resistance within the acceptable resistance range and upon a determination that the resistance of the load 110 is within the acceptable range, the PSE 102 generates a signal to permit the application of power to the load $R_L$ 110 by the PSE. In response to the generation of the signal indicating that the load resistance is within an acceptable range, the PSE 102 applies power to the load $R_L$ 110.

Figure 2:
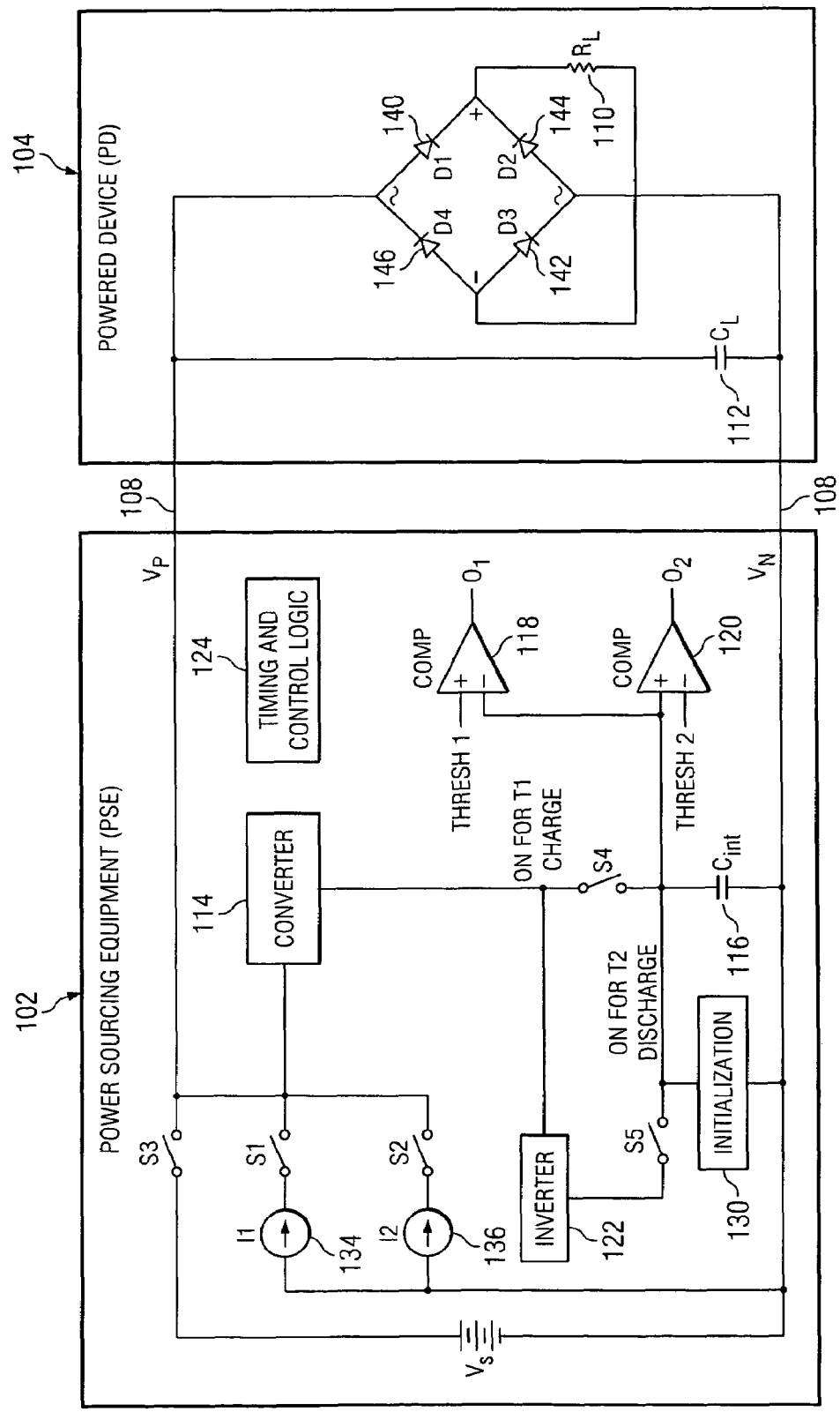
FIG. 2 is a more detailed block diagram of a first embodiment of the system depicted in FIG. 1 for determining if a load within a PD has a resistance within a predetermined range of resistance.

FIG. 2 depicts a more detailed block diagram of the system 100 of FIG. 1. The operation of the system 100 is described in terms of a test of the load $R_L$ 110 to determine if the resistance of the load is within an acceptable resistance range. In the case of the PoE specification, the load is deemed to be acceptable if it is between 17,000 ohms and 29,000 ohms. It should be appreciated that the actual acceptable resistance range may vary in different applications.

To initiate the test to determine whether the resistance of the load $R_L$ 110 is within the acceptable resistance range, switch S1 is closed to couple a first current source 134 to the output port Vp to convey a first test current $i_1$ through the cable 108 to the PD 104. The first test current $i_1$ produces a voltage drop at the output port of the PSE corresponding to the voltage drop across the two diodes D1 140 and D3 142 (assuming that the diodes are forward biased) plus the voltage drop across the load $R_L$ 110 which equals $i_1 * R_L$. It is assumed that the voltage drop across the cable is negligible.

A voltage to current converter 114 detects the voltage at the output port (Vp-Vn) and generates a recharge current that is proportional to the output port voltage. The proportionality factor is a factor (f).

Figure 3:
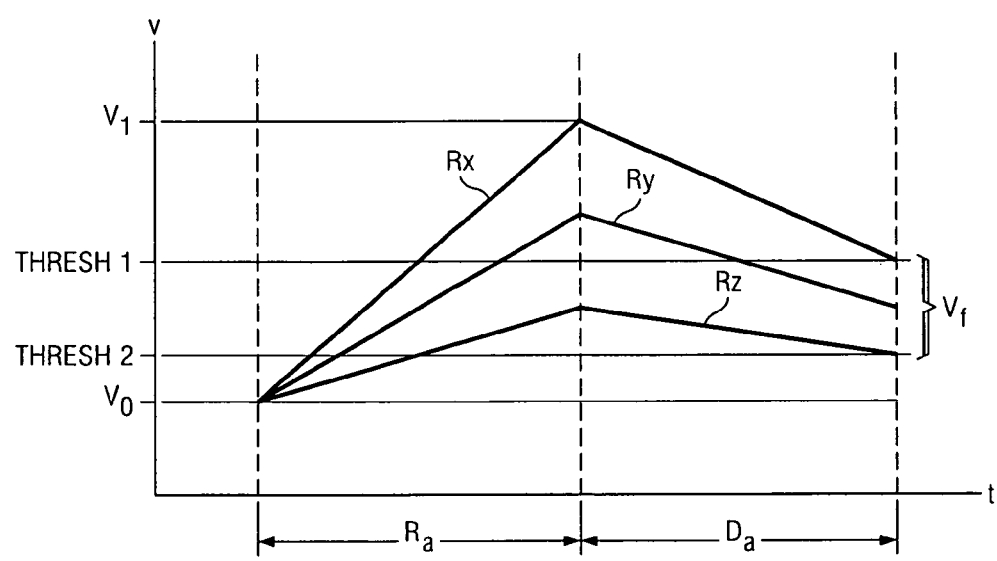
FIG. 3 is a diagram depicting integration and de-integration on the capacitor $C_{int}$ depicted in FIG. 2 during operation of the presently disclosed system.

Integration capacitor $C_{int}$ 116 is initialized to a predetermined starting voltage $V_0$ with initialization circuitry 130. FIG. 3 depicts the voltage on the integration capacitor $C_{int}$ 116 as a function of time that would be observed for three loads. More specifically, the upper plot illustrates the voltage on the capacitor $C_{int}$ 116 for a load $R_L$ 110 having a resistance $R_x$ corresponding to the maximum acceptable resistance, the middle plot illustrates the voltage on the capacitor $C_{int}$ 116 for a load $R_L$ 110 having a resistance $R_y$ corresponding to a resistance within the acceptable resistance range, and the lower plot illustrates the voltage on the capacitor $C_{int}$ 116 for a load $R_L$ 110 having a resistance $R_z$ corresponding to the lowest acceptable resistance. Referring to FIGS. 2 and 3, at the beginning of a first time period $R_a$, when the voltage on the capacitor $C_{int}$ 116 equals $V_0$, switch S4 is closed and the voltage on capacitor $C_{int}$ 116 charges or integrates for the first time period $R_a$ which is referred to herein as recharge interval $R_a$. At the end of the recharge interval $R_a$, switch S4 opens and charging of the capacitor ceases. The voltage on the capacitor $C_{int}$ following the recharge interval $R_a$ is an intermediate voltage $V_1$ that equals the initial voltage $V_0$ on the capacitor $C_{int}$ 116 plus the increase in the voltage due to the charging of the capacitor $C_{int}$ 116 during the recharge interval $R_a$. The increase in the voltage ($V_1-V_0$) on the capacitor $C_{int}$ 116 equals:

$$(i_1 * dt)/C_{int}$$

Accordingly, the peak voltage on the capacitor $C_{int}$ 116 is approximately equal to $V_1$ as indicated below assuming that the effects of shunt capacitor $C_L$ 112 are not significant:

$$V_1 = V_0 + \frac{(f) * [(i_1 * R_L) + (2^* \cdot V_d)] * Tn}{C_{int}}$$

$$= V_0 + \frac{(f) * Tn * (i_1 * R_L)}{C_{int}} + \frac{(f) * (Tn) * (2 * V_d)}{C_{int}}$$

where:
  f equals a conversion factor that specifies the output current from the voltage to current converter 114 for a given input voltage to the converter 114;
  $i_1$ equals the magnitude of the current produced by the current source I1;
  $R_L$ is resistance of the load $R_L$ 110;
  $V_d$ equals the voltage drop across a forward biased diode assuming diodes are present. If no diodes are present $V_d$ equals 0 in the illustrated equations; and
  $T_n$ equals the length of time for the charging period R1.

Following the recharge interval $R_a$, the PSE 102 discharges the capacitor $C_{int}$ 116 from the voltage $V_1$ for a second period $D_a$ equal in duration to the recharge interval $R_a$. The second period $D_a$ is referred to herein as a discharge interval $D_a$. At the beginning of the discharge interval $D_a$, switch S2 is closed (S1 is open) and a second test current of magnitude $i_2$ from the second current source 136 is coupled through the output port and the cable 108 to the PD 104. The second test current $i_2$ from the second current source 136 is different than the first test current $i_1$ and in the illustrated embodiment, the second test current is less than the first test current. When the current i2 is delivered to the load $R_L$ 110, the voltage between Vp and Vn at steady state equals:

$$((i_1 - \Delta i) * R_L) + (2 * V_d)$$

where $\Delta i$ equals $(i_1 - i_2)$.

At the beginning of the discharge interval $D_a$ (see FIG. 3), switch S5 is closed and remains closed for the discharge interval $D_a$. During this period S4 is open. The current produced by the voltage to current converter 114 during the discharge interval $D_a$ is equal to the proportionality factor (f) times the output port voltage (Vp-Vn). The current produced by the voltage to current converter 114 is inverted by current inverter 122 and is applied to the capacitor $C_{int}$ 116 so as to discharge the capacitor $C_{int}$ 116 from the intermediate voltage $V_1$ that was achieved following the recharge interval $R_a$.

Alternatively, a current source within the voltage to current converter 114 may be coupled between respective ends of the capacitor $C_{int}$ 116 so as to discharge the capacitor when the current source is active. Discharging of $C_{int}$ 116 continues for the period $D_a$. The magnitude of the voltage drop ($d_v$) on the capacitor $C_{int}$ 116 at the end of the discharge interval $D_a$ thus equals approximately (I*dt)/C or:

$$\frac{(f)*[(I1 - \Delta i)*R_L) + (2*V_d))]*Tn}{C_{int}} =$$
$$\frac{(f)*(Tn)*(I1*R_L)}{C_{int}} - \frac{(f)*(Tn)*(\Delta i*R_L)}{C_{int}} + \frac{(f)*(Tn)*(2V_d)}{C_{int}}$$

The length of the interval Tn is the same for both the time periods $R_a$ and $D_a$. Consequently, voltage $V_f$ on the capacitor $C_{int}$ 116 following the discharge interval $D_a$ equals:

$$V_f = V_0 + \frac{(f)*(Tn)*(\Delta i*R_L)}{Cint}$$

Thus, the voltage $V_f$ on the capacitor $C_{int}$ 116 following the discharge interval $D_a$ depends on the load resistance and other predefined system values but is independent of series connected diodes. More specifically, the only non-PSE variable in the equation is the resistance of the load $R_L$.

Following the discharge interval $D_a$, the voltage $V_f$ on the capacitor $C_{int}$ 116 is compared, using comparator 118, against an upper threshold voltage, Threshold 1, corresponding to the voltage $V_f$ that would be produced if the load resistance $R_L$ 110 equaled the maximum acceptable load resistance. Using another comparator 120, the voltage $V_f$ is also compared to a lower threshold voltage, Threshold 2, corresponding to the voltage $V_f$ that would be produced if the load resistance equaled the minimum acceptable load resistance. If the comparisons indicate that the resistance of the load $R_L$ 110 is greater than the maximum acceptable load resistance or less than the minimum acceptable load resistance, the voltage source $V_s$ is not coupled to the load 110. If the test reveals that the resistance of the load 110 is not outside the acceptable resistance range, the PSE 102 couples the voltage source $V_s$ to the load 110 within the PD 104 by closing switch S3.

While the switches S1, S2, S3, S4 and S5 are shown schematically, it should be appreciated that the switches may be any switching device operative to perform the desired switching function including, but not limited to, semiconductor switches or mechanical switches. All switches and timing functions are controlled by timing and control logic 124.

While the embodiment illustrated above includes a recharge interval $R_a$ and a discharge interval $D_a$ during which the capacitor $C_{int}$ 116 is charged and discharged respectively, it should also be appreciated that the capacitor $C_{int}$ 116 may be discharged from an initial voltage $V_0$ during an initial de-integration phase and subsequently charged in an integration phase without departing from the presently disclosed invention. More specifically, the voltage to current converter 114 in such an embodiment generates a first discharge current employing inverter 122 during the first time period $R_a$ based on the voltage produced as a consequence of the application of the current $i_1$ to the load $R_L$ 110 within the PD 104. During the integration phase corresponding to second time period $D_a$, the test current $i_2$ (which is less than the test current $i_1$ in the illustrated embodiment, is applied to the load $R_L$ 110, and the voltage to current converter 114 generates a charging current which is used to charge the capacitor $C_{int}$ 116. The final voltage $V_f$ on the capacitor $C_{int}$ 116 following the integration phase is compared to upper and lower voltage thresholds to determine if the load resistance $R_L$ 110 is below the minimum acceptable resistance or above the maximum acceptable resistance, respectively, as discussed above, so that the voltage source can be applied to the load if the resistance of the load is within the acceptable resistance range.

The integration and de-integration phases may be contiguous as illustrated in FIG. 3 or spaced apart in time to allow a settling time after activating each current source 11 and 12 and prior to initiating the charging and discharging of $C_{int}$. By delaying integration and de-integration of $C_{int}$ 116 from the time when the currents $i_1$ and $i_2$ are coupled to the output port, the voltage on the output port is allowed to stabilize in the event a shunt capacitance $C_L$ 112 in the PD would prevent the voltage between Vp and Vn from achieving a steady state by the time the integration or de-integration of the capacitor $C_{int}$ 116 starts.

The above-described embodiments may be used to determine whether a load resistance $R_L$ 110 is within, or outside, the predefined acceptable resistance range, irrespective of whether diodes are disposed in series with the load, since, as noted from the equations above, the final capacitor voltage on $C_{int}$ 116 is substantially independent of the voltage drops across series connected diodes D1-D4. It is noted that there may be a very small effect observed due to the presence of diodes in series with the load due to the characteristic curve of voltage as a function of current for any diodes in series with the load, however, this effect is insignificant for present purposes.

By way of further illustration, assume the first current source 134 produces a test current of 275 microamps and the second current source 136 produces a test current of 165 microamps. Further assume that the starting voltage on the capacitor $C_{int}$ 116 is initialized to 2 volts and it is desired that the voltage $V_1$ on the capacitor $C_{int}$ 116 equals 7 volts when the load resistance $R_L$ 110 equals 29,000 ohms. Additionally, assume the recharge and discharge intervals equal 16 milliseconds and $C_{int}$ 116 has a capacitance of 1 microfarad. In this example, f equals approximately $97.96*10^{-6}$. Threshold 1 is therefore calculated as follows:

$$\text{Threshold 1} = V_0 + \frac{(f)*(Tn)*(\Delta i)*R_L}{Cint}$$
$$= 2 + \frac{(97.96*10^{-6})*(16*10^{-3})*(110*10^{-6})*(29*10^{-3})}{1*10^{-6}}$$
$$= 2 + 5.00$$
$$= 7.00 \text{ volts}$$

Assuming that the minimum acceptable load resistance is 17,000 ohms, threshold 2 for comparator 120 in the above example equals:

$$\text{Threshold 2} = V_0 + \frac{(f)*(Tn)*(\Delta i)*R_L}{Cint}$$
$$= 2 + \frac{(97.96*10^{-6})*(16*10^{-3})*(110*10^{-6})*(17*10^{-3})}{1*10^{-6}}$$

-continued $$= 2 + 2.931$$

$$= 4.931 \text{ volts}$$

While the PSE 102 depicted in FIG. 2 employs first and second comparators 118, 120 for comparing the final voltage on the capacitor $C_{int}$ 116 to first and second thresholds, it should be appreciated that a single comparator may be employed to make the same determination by performing two comparisons in succession and comparing the final voltage against one of the thresholds in the first comparison and by comparing the final voltage against the other one of the thresholds in the second comparison.

It should also be noted that the load resistance referenced above, may comprise an apparent resistance present by any load to the PSE, such as an actual resistive load, one or more non-linear elements alone or in combination with other circuitry, active circuitry, or any other load presented to the PSE.

Figure 4:
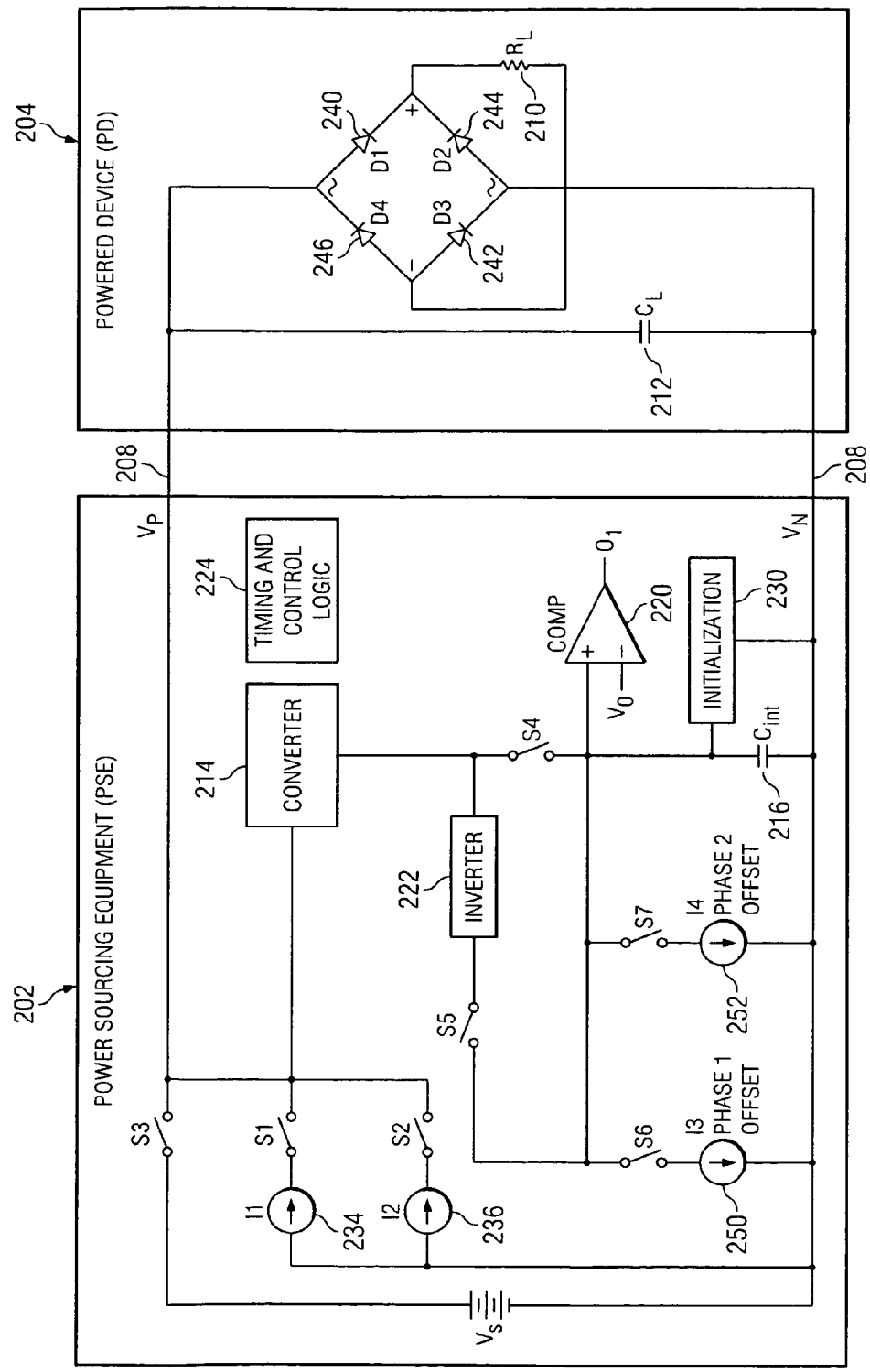
FIG. 4 is a block diagram of another embodiment of the system of FIG. 1 that employs a first recharge-discharge cycle in the PSE during a first phase to determine if the load in the PD has a resistance below a predetermined minimum acceptable resistance and that employs a second recharge-discharge cycle in the PSE during a second phase to determine if the load in the PD is above a predetermined maximum acceptable resistance.
Figure 5:
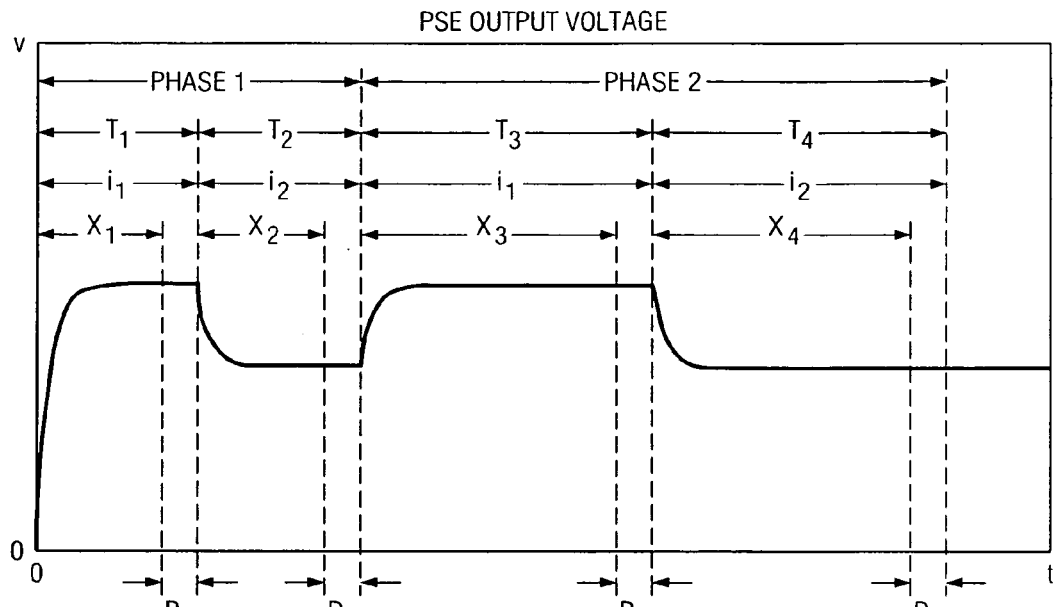
FIG. 5 is a timing diagram depicting an exemplary output voltage (Vp-Vn) as a function of time in the embodiment of FIG. 4.

FIG. 4 depicts a block diagram of another embodiment that is operative to determine if a load within a PD is within a predetermined resistance range. In the system illustrated in FIG. 4, PSE 202 is coupled to a load $R_L$ 210 within a PD 204 via a cable 208. Referring to FIG. 5, the timing of the system illustrated in FIG. 4 includes a first phase in which the PSE 202 determines whether the load $R_L$ 210 has a resistance that is less than a predetermined minimum acceptable resistance and a second phase in which a determination is made whether the load resistance is greater than a predetermined maximum acceptable resistance. The first phase includes a first time period $T_1$ that includes a first recharge interval $R_1$ and a second time period T2 that includes a first discharge interval $D_1$. The second phase includes a third time period $T_3$ that includes a second recharge interval $R_2$ and a fourth time period $T_4$ that includes a second discharge interval $D_2$.

While the cable 208 is illustrated as being coupled to the load $R_L$ 210 through a rectifier bridge that includes diodes D1-D4, the cable 208 may be coupled directly to respective ends of the load $R_L$ 210 in other embodiments of PDs without impacting the ability of the PSE to determine whether the load is within a predetermined resistance range.

Figure 6:
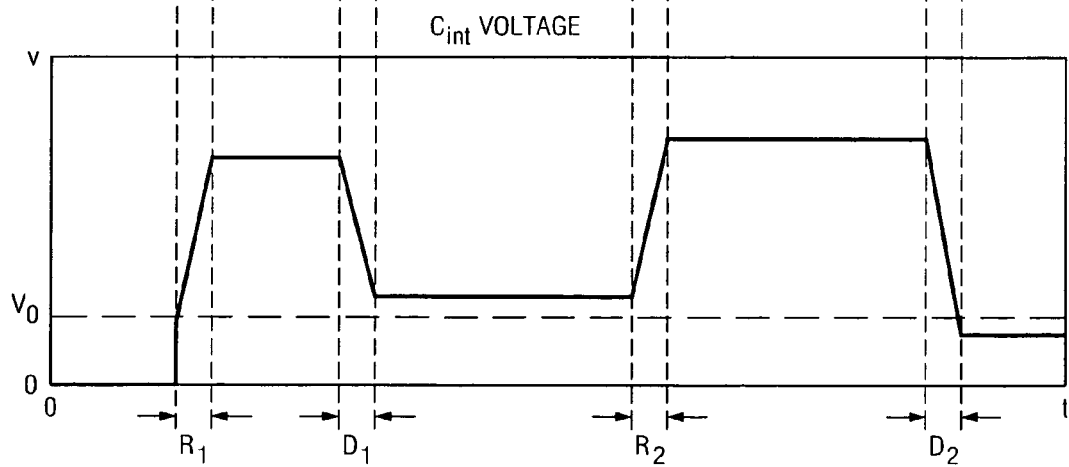
FIG. 6 is a timing diagram depicting an exemplary voltage as a function of time on capacitor $C_{int}$ in the embodiment of FIG. 4 for a load having a resistance between the predetermined minimum and maximum acceptable resistance values.
Figure 7:
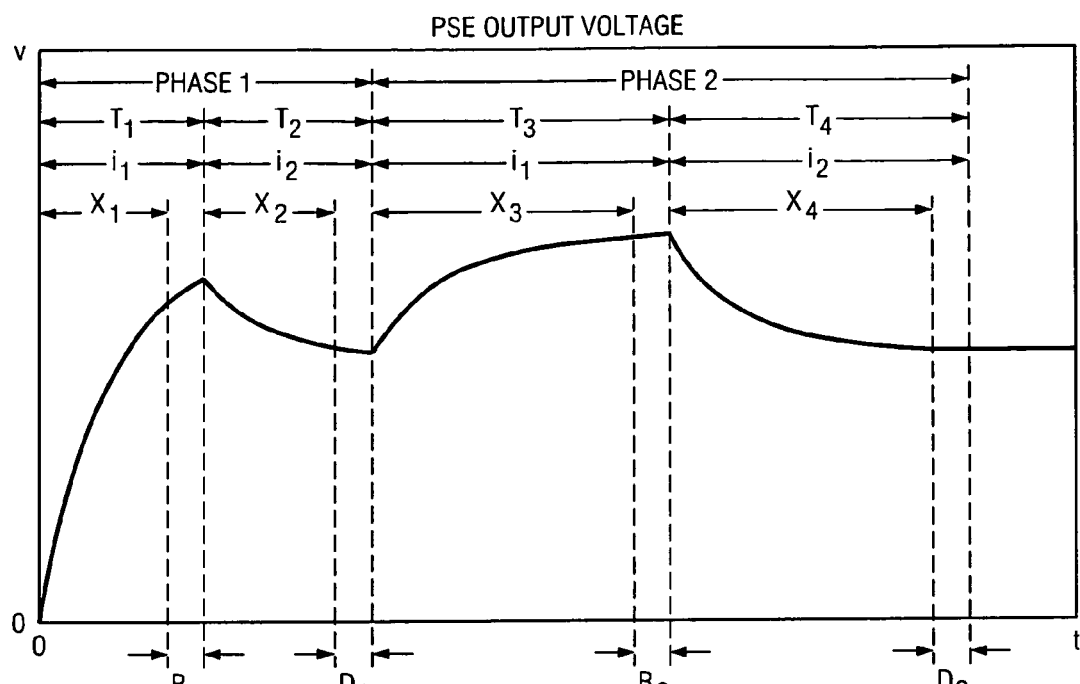
FIG. 7 is a timing diagram depicting an exemplary output voltage (Vp-Vn) as a function of time in the embodiment of FIG. 4 in the circumstance where the PD includes a large capacitance in parallel with the load.
Figure 8:
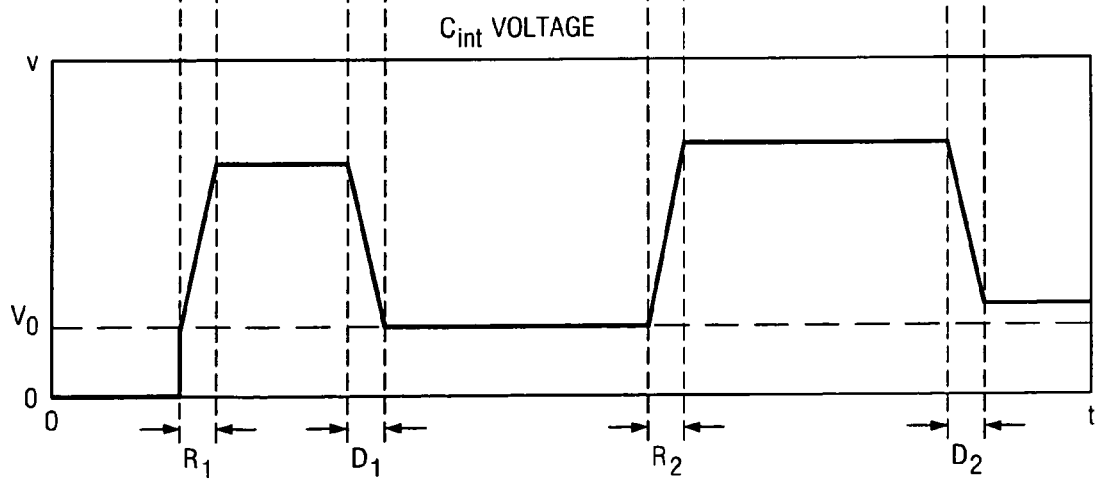
FIG. 8 is a timing diagram depicting an exemplary voltage as a function of time on capacitor $C_{int}$ in the embodiment of FIG. 4 for a load in a PD having a large capacitance in parallel with the load.

The operation of the PSE 202 is discussed initially with respect to the block diagram of FIG. 4 and the timing diagrams of FIGS. 5 and 6. FIG. 5 illustrates the differential voltage between the output ports Vp and port Vn and FIG. 6 depicts the voltage on the capacitor $C_{int}$ 216 as a function of time in a circumstance in which the load $R_L$ 210 has a resistance within the predefined acceptable resistance range.

At the commencement of the first phase, at time $t_0$, the PSE applies a first test current of magnitude $i_1$ generated by a first current source 234 to the output port Vp by closing switch S1. Additionally, the voltage on the integration capacitor $C_{int}$ 216 is initialized to a starting voltage $V_0$ by initialization circuitry 230. The first test current $i_1$ produces voltage drops through diodes D1 and D3 (when forward biased) and produces a voltage drop across the load $R_L$ 210 equal to $i_1 * R_L$. A voltage to current converter 214 receives an input voltage (Vp-Vn) and generates a current that is proportional to Vp-Vn; i.e. (Vp-Vn)*(f) where (f) is a voltage to current conversion factor. After a settling time $X_1$, switch S4 is closed to allow the current produced by the voltage to current converter 214 to begin charging the capacitor $C_{int}$ 216 during a first recharge interval $R_1$. The settling time $X_1$ is provided to permit the output port voltage (Vp-Vn) to stabilize in the event a shunt capacitance $C_L$ 212 is present in the PD 204. The capacitor $C_{int}$ 216 is charged during the first recharge interval $R_1$ for a predetermined time interval. At the end of the first recharge interval $R_1$ the voltage on the capacitor $C_{int}$ 216 equals a first intermediate voltage $V_1$ calculated as described hereinabove with respect to the prior embodiment. Following the first recharge interval $R_1$, switches S1 and S4 are opened to cease the charging of the capacitor $C_{int}$ 216.

At the end of the recharge interval $R_1$, switch S1 is opened and switch S2 is closed to apply a second test current i2 to the load $R_L$ 210 from the output port Vp of the PSE 202. The second test current $i_2$ in the illustrated embodiment is less than the first test current $i_1$. The application of the second test current $i_2$ to the output port Vp generates a voltage differential between Vp and Vn which is less than the voltage differential during the application of first test current $i_1$ to the load $R_L$ 210. The voltage to current converter 214 generates a current that is proportional to the output port voltage (Vp-Vn); i.e. (f)*(Vp-Vn). The current produced by the voltage to current converter 214 is inverted by a current inverter 222. After a settling period $X_2$, switch S5 is closed and S4 is opened to commence discharging of the capacitor $C_{int}$ 216 during a discharge interval $D_1$ which is equal in duration to the recharge interval $R_1$. During the discharge interval $D_1$, the capacitor $C_{int}$ 216 is also discharged with a phase one offset current $i_3$ generated by a phase one offset current source 250. The current produced by the phase one offset current source 250 is specified such that the sum of the current from the inverter 222 plus the current from the phase one offset current source 250 discharges the capacitor $C_{int}$ 216 to $V_0$ at the end of the discharge interval $D_1$ if the resistance of the load $R_L$ 210 equals the minimum acceptable load resistance. At the end of the discharge interval $D_1$ the voltage on the capacitor $C_{int}$ 216 equals a first final voltage $V_{1f}$.

Following the $D_1$ discharge interval, the voltage $V_{1f}$ on the capacitor $C_{int}$ 216 is tested using comparator 220 to determine whether the voltage $V_{1f}$ is less than $V_0$. More specifically, if the output voltage $O_1$ of the comparator 220 indicates that the voltage on the capacitor $C_{int}$ 216 is less than $V_0$, such indicates that the resistance of the load $R_L$ 210 is less than the minimum acceptable resistance for the load. As illustrated in FIG. 6, the voltage on the capacitor $C_{int}$ 216 is greater than $V_0$ indicating that the resistance of the load $R_L$ 210 is greater than the minimum acceptable load resistance.

Following the completion of the phase one test, the phase two test is performed in which a determination is made whether the resistance of the load $R_L$ 210 is greater than a maximum acceptable load resistance. At the beginning of the phase two test, the voltage on the capacitor $C_{int}$ 216 is initialized to a starting value, such as $V_0$, via initialization logic 230. Additionally, switch S1 is closed and switch S2 is opened to apply a third test current $i_1$ to the output port Vp of the PSE 202. The passage of a current $i_1$ through the load $R_L$ 210 and series connected diodes (if present) produces a voltage (Vp-Vn) at the output port of the PSE. The voltage to current converter 214 generates a recharge current that is proportional to the output port voltage and that equals (f)*(Vp-Vn). After a settling period $X_3$, switch S4 is closed to couple the recharge current from the voltage to current converter to the integration capacitor $C_{int}$ 216 and the capacitor $C_{int}$ 216 is charged during the second recharge interval $R_2$. Following the second recharge interval $R_2$ the voltage on the capacitor $C_{int}$ 216 equals a second intermediate voltage $V_2$. At the end of the recharge interval $R_2$, S4 is opened to terminate charging of the capacitor $C_{int}$ 216.

During time period $T_4$, the capacitor $C_{int}$ 216 is discharged from the second intermediate voltage $V_2$ to a second final voltage $V_{2f}$ as described below. Following the second recharge interval $R_2$, switch S1 is opened and switch S2 is closed to apply a fourth test current $i_2$ to the output port Vp of the PSE 202. As previously discussed, the fourth test current $i_2$ is less than the third test current $i_1$. The application of the fourth test current $i_2$ to the output port Vp generates a voltage at the output port of the PSE (Vp-Vn) which is less than the output port voltage resulting from the application of current $i_1$ to the load $R_L$ 210. The voltage to current converter 214 generates a second discharge current that is proportional to the output port voltage (Vp-Vn); i.e. (f)*(Vp-Vn). The current produced by the voltage to current converter 214 is inverted by a current inverter 222. After a settling period $X_4$, switch S5 is closed, switch S7 is closed and switch S4 is opened, to commence discharging of the capacitor $C_{int}$ 216 during a the second discharge interval $D_2$. The second discharge interval $D_2$ is equal in duration to the second recharge interval $R_2$. During the discharge interval $D_2$, the capacitor $C_{int}$ 216 is discharged from the second intermediate voltage $V_2$ with a phase two offset current $i_4$ generated by a phase two offset current generator 252 in addition to the second discharge current from the inverter 222. The magnitude of the phase two offset current produced $i_4$ by the phase two offset current source 252 is specified such that the sum of the currents from the inverter 222 and the phase two offset current source 252 will discharge the capacitor $C_{int}$ 216 to $V_0$ at the end of the second discharge interval $D_2$ if the resistance of the load $R_L$ 210 equals the maximum acceptable load resistance.

Following the second discharge interval $D_2$, the voltage $V_{2f}$ on the capacitor $C_{int}$ 216 is tested using comparator 220 to determine whether the voltage $V_{2f}$ is greater than $V_0$. More specifically, if the output voltage $O_1$ of the comparator 220 indicates that the voltage on the capacitor $C_{int}$ 216 is greater than $V_0$, such indicates that the resistance of the load $R_L$ 210 is greater than the maximum acceptable resistance for the load. As illustrated in FIG. 6, the voltage on the capacitor $C_{int}$ 216 is less than $V_0$, indicating that the resistance of the load $R_L$ 210 is less than the maximum acceptable load resistance.

In the example depicted in FIGS. 5 and 6, the resistance of the load $R_L$ 210 is shown to be greater than the minimum acceptance resistance and less than the maximum acceptable resistance. Accordingly, the resistance of the load $R_L$ 210 is within the predetermined acceptable resistance range. Accordingly the timing and control logic 224 controls the PSE 202 to apply $V_s$ to the load $R_L$ 210 by closure of switch S3.

If the settling times within both phases are the same, the presence of a sufficiently large parallel capacitance within the PD may cause the PSE to consider the PD as a valid PD even if the load resistance of load $R_L$ 210 exceeds the maximum acceptable resistance value since the presence of a large capacitor in parallel with the load appears equivalent to a load of a lesser resistance. This result obtains since the settling time does not permit the port voltage (Vp-Vn) to stabilize before the capacitor $C_{int}$ 216 begins recharging. As a consequence, the final voltage of each phase is lower than it would be in the absence of the shunt capacitance. In the presence of a large shunt capacitance $C_L$ 212, when the final voltage on the capacitor $C_{int}$ in the second phase goes below $V_0$, while the voltage test following the first phase indicates that the voltage on the capacitor $C_{int}$ 216 is still above $V_0$, the PD 204 is recognized as being acceptable even though the resistance is not within the acceptable resistance range.

To address the foregoing problem in the second embodiment discussed hereinabove, the settling times in phase two are made significantly greater that the settling times in phase one. In one embodiment, the settling times in phase two were set to be twice the settling times in phase one. The settling times in phase two are typically longer than the settling times in phase one. Typically, the phase two settling times are at least 1.2 times the length of the settling times for phase one noting that the longer the settling times in phase two, the greater the ability of the system to accommodate a large shunt capacitance. For example, in one embodiment the first and second recharge and discharge intervals were set at 16 milliseconds, the settling times during phase one were set as 64 milliseconds and the settling times in phase two were set at 128 milliseconds. The net effect of making the settling times in phase two greater than the settling times in phase one is that a large shunt capacitance $C_L$ 212 across the load $R_L$ 210 will have a greater effect on the first phase since the port voltage (Vp-Vn) will have less time to reach steady state. During the first recharge interval $R_1$ the charging of the capacitor $C_{int}$ 216 is done with less current in the presence of a large shunt capacitance $C_L$ 212 and the discharge cycle proceeds with a greater current. Thus, the final voltage $V_{1f}$ on the capacitor $C_{int}$ 216 at the end of the first phase will go down more than the final voltage $V_{2f}$ at the end of the second phase. Thus, as the shunt capacitance is increased, the final voltage on the capacitor $C_{int}$ 216 at the end of the first phase will go below the final voltage on the capacitor $C_{int}$ 216 at the end of the second phase which will be detected as a PD having an unacceptable load since a PD is rejected when the final voltage $V_{1f}$ on the capacitor $C_{int}$ 216 at the end of the first phase is less than $V_0$ or when the final voltage $V_{2f}$ on the capacitor $C_{int}$ 216 at the end of the second phase is greater than $V_0$.

It will be appreciated by those of ordinary skill in the art that variations of and modifications to the above-described system and method for detecting whether a load is within an acceptable resistance range may be made departing from the inventive concepts disclosed herein. Accordingly, the invention is not to be viewed as limited except by the scope and spirit of the following claims.

What is claimed is:

1. Apparatus associated with power sourcing equipment having an output port, the apparatus for determining whether a load in a powered device that is coupled to the power sourcing equipment via a conductive cable via the output port has an acceptable resistance, the apparatus comprising:

at least one current source for generating first and second test currents during successive first and second time periods, wherein the second test current is different in magnitude from the first test current; and control logic operative to couple the first and second test currents to the cable during the first and second successive time periods to produce successive first and second output port voltages based at least in part upon respective first and second voltage drops across the load produced by the first and second test currents when the first and second test currents are coupled to the load through the cable;

a converter operative to generate first recharge and discharge currents responsive to the first and second output port voltages respectively, the magnitude of the first recharge and first discharge currents being proportional to the first and second output voltages respectively by a proportionality factor;

a capacitor, the control logic further operative to:

couple the first recharge current to the capacitor to charge the capacitor from an initial voltage to a first intermediate voltage during a first recharge interval; and couple the first discharge current to the capacitor to discharge the capacitor from the first intermediate voltage to a first final voltage during a first discharge interval, the discharge interval equal in duration to the recharge interval; and at least one comparator operative in response to the control logic to determine whether the load has a resistance less than a predetermined minimum acceptable resistance by comparing the first final voltage on the capacitor against a first predetermined first threshold voltage.

2. The apparatus of claim 1 wherein the second current is less than the first current.

3. The apparatus of claim 1 wherein the at least one comparator is further operative in response to the control logic to determine whether the load has a resistance greater than a predetermined maximum acceptable resistance by comparing the first final voltage on the capacitor to a second predetermined threshold voltage.

4. The apparatus of claim 3 further including a power source, wherein the control logic is operative to couple the power source to the load via the cable in the event the at least one comparator indicates that the load has a resistance that is not less than the minimum acceptable resistance and that is not greater than the maximum acceptable resistance following a comparison of the first final voltage to the first and second predetermined threshold voltages respectively.

5. The apparatus of claim 3 wherein the at least one comparator comprises first and second comparators and wherein the first comparator is operative to test the first final voltage against the first predetermined threshold voltage and the second comparator is operative to test the first final voltage against the second predetermined threshold voltage.

6. The apparatus of claim 3 wherein the at least one comparator comprises a single comparator and wherein the single comparator is operative to test the first final voltage against the first and second predetermined threshold voltages sequentially.

7. The apparatus of claim 1 further including initialization logic responsive to the control logic for initializing the capacitor to the initial voltage in advance of the first recharge interval.

8. The apparatus of claim 1 wherein the at least one current source is further operative to generate third and fourth test currents during third and fourth successive time periods respectively, wherein the fourth test current is different in magnitude from the third test current;

the control logic being operative to couple the third and fourth test currents to the cable during the successive third and fourth time periods to produce respective third and fourth output port voltages based at least in part upon a voltage drop across the load produced by the third and fourth test currents when coupled to the load through the cable;

the converter being operative to generate second recharge and second discharge currents responsive to the third and fourth output port voltages respectively, the magnitude of the second recharge and discharge currents being proportional to the third and fourth output voltages respectively by the constant proportionality factor;

at least one offset current source operative during the second time period and the fourth time period to generate first and second fixed offset currents respectively;

the control logic being further operative to:

couple the at least one offset current source to the capacitor to discharge the capacitor with the first fixed offset current in addition to the first discharge current during the first discharge interval, wherein the first fixed offset current is specified so as to discharge the capacitor to the initial voltage when summed with the first discharge current in the circumstance where the load equals the predetermined minimum acceptable resistance;

couple the second recharge current to the capacitor to charge the capacitor from the initial voltage to a second intermediate voltage during a second recharge interval within the third time period; and couple the second discharge current and the second offset current to the capacitor during a second discharge interval within the fourth time period to discharge the capacitor from the second intermediate voltage to a second final voltage, the second discharge interval equal in duration to the second recharge interval, wherein the second fixed offset current is specified so as to discharge the capacitor to the initial voltage when summed with the second discharge current in the circumstance where the load equals the predetermined maximum acceptable resistance; and the at least one comparator operative in response to the control logic to determine whether the load has a resistance greater than the predetermined maximum acceptable resistance by comparing the second final voltage on the capacitor against a second predetermined threshold voltage.

9. The apparatus of claim 8 wherein the fourth current is less than the third current.

10. The apparatus of claim 8 wherein the first and second predetermined threshold voltages are the same voltage.

11. The apparatus of claim 8 wherein the first and second recharge currents have a same first magnitude and the first and second discharge currents have a same second magnitude which is less than the first magnitude.

12. The apparatus of claim 8 further including initialization logic responsive to the control logic for initializing the capacitor to the initial voltage in advance of the second recharge interval.

13. The apparatus of claim 8 wherein the control logic is operative to initiate the first recharge and discharge intervals after the beginning of respective first and second time periods by respective first and second predetermined settling time periods and to initiate the second recharge and discharge intervals after the beginning of respective third and fourth time periods by respective third and fourth predetermined settling time periods, wherein the third and fourth predetermined settling time periods are greater in duration than the first and second predetermined settling time periods.

14. The apparatus of claim 13 wherein the first and second predetermined settling time periods are equal in duration and the third and fourth predetermined settling time periods are equal in duration.

15. The apparatus of claim 13 wherein the third and fourth predetermined settling time periods are at least 1.2 times as long as respective first and second settling time periods.

16. The apparatus of claim 8 further including a power source, wherein the control logic is operative to couple the power source to the output port in the event the at least one comparator indicates that the load has a resistance that is not less than the minimum acceptable resistance following a comparison of the first final voltage to the first predetermined threshold voltage and not greater than the maximum acceptable resistance following a comparison of the second final voltage to the second predetermined threshold voltage.

17. The apparatus of claim 16 wherein the first and second predetermined threshold voltages are the same voltage.

18. Apparatus associated with power sourcing equipment having an output port, the apparatus for determining whether a load in a powered device that coupled to the power sourcing equipment via a conductive cable is within an acceptable range of resistance, the apparatus comprising:

at least one voltage source for generating first and second test voltages during respective first and second successive time periods, wherein the second test voltage is different from the first test voltage; and control logic operative to couple the at least one first voltage source to the cable during the first and second successive time periods to produce successive first and second output port currents during respective time periods;

a converter operative to generate first recharge and discharge currents responsive to the first and second output port currents respectively, the magnitude of the first recharge and discharge currents being proportional to the first and second output currents respectively by a proportionality factor;

a capacitor, the control logic further operative to:
couple the first recharge current to the capacitor to charge the capacitor from an initial voltage to a first intermediate voltage during a first recharge interval within the first time period; and
couple the first discharge current to the capacitor to discharge the capacitor from the first intermediate voltage to a first final voltage during a first discharge interval within the second time period, the discharge interval equal in duration to the recharge interval; and at least one comparator operative in response to the control logic to determine whether the load has a resistance less than a predetermined minimum acceptable resistance by comparing the first final voltage on the capacitor against a first predetermined threshold voltage.

19. The apparatus of claim 18 wherein the second test voltage is less than the first test voltage.

20. The apparatus of claim 18 wherein the at least one voltage source is further operative to generate third and fourth test voltages during third and fourth successive time periods respectively, wherein the fourth test voltage is different from the third test voltage;

the control logic being operative to couple the at least one voltage source to the cable during the third and fourth successive time periods to produce third and fourth output port currents;

the converter being further operative to generate second recharge and second discharge currents responsive to the third and fourth output port currents respectively, the magnitude of the second recharge and discharge currents being proportional to the third and fourth output port currents respectively by the proportionality factor;

at least one offset current source operative during the second time period and the fourth time period to generate first and second fixed offset currents;

the control logic being further operative to:
couple the at least one offset current source to the capacitor to discharge the capacitor with the first fixed offset current in addition to the first discharge current during the first discharge interval; couple the second recharge current to the capacitor to charge the capacitor from the initial voltage to a second intermediate voltage during a second recharge interval within the third time period; and
couple the second discharge current and the second offset current to the capacitor during a second discharge interval within the fourth time period to discharge the capacitor from the second intermediate voltage to a second final voltage, the second discharge interval equal in duration to the second recharge interval; and the at least one comparator operative in response to the control logic to determine whether the load has a resistance greater than a predetermined minimum acceptable resistance by comparing the second final voltage on the capacitor against a second predetermined threshold voltage.

21. A method for determining whether power sourcing equipment having an output port may apply a voltage source to a load in a system in which the load in a powered device is coupled to the power sourcing equipment via a cable via the output port, the method comprising:

generating first and second currents within the power sourcing equipment during first and second sequential time periods, wherein the second current is different than the first current;

coupling the first and second currents to the output port during respective first and second time periods to generate first and second output port voltages respectively, produced, at least in part from the passage of the first and second currents through the load;

generating first recharge and discharge currents that are proportional to the first and second output port voltages by a proportionality factor;

during a first recharge interval in the first time period, charging a capacitor from an initial voltage to a first intermediate voltage using the first recharge current and in a first discharge interval in the second time period, discharging the capacitor from the intermediate voltage to a first final voltage using the first discharge current;

in a first comparison, comparing the first final voltage to a first predetermined threshold voltage to determine whether a resistance of the load is less than a minimum acceptable resistance; and preventing the voltage source from being coupled to the load in the event the comparison indicates that the resistance of the load is less than the minimum acceptable resistance.

22. The method of claim 21 wherein the second current is less than the first current.

23. The method of claim 21 further including the steps of:
in a second comparison, comparing the first final voltage to a second predetermined threshold voltage to determine whether the resistance of the load is greater than a maximum acceptable resistance; and
preventing the voltage source from being coupled to the load in the event the comparison indicates that the resistance of the load is greater than the maximum acceptable resistance.

24. The method of claim 23 further including the step of coupling the power source to the load in the event the first comparison indicates that the resistance of the load is not less than the minimum acceptable resistance and the second comparison indicates that the resistance of the load is not greater than the maximum acceptable resistance.

25. The method of claim 21 further including the steps of:
generating third and fourth currents during third and fourth successive time periods, wherein the fourth current is different than the third current;
coupling the third and fourth currents to the output port during respective third and fourth sequential time periods following the first and second sequential time periods to generate third and fourth output port voltages respectively, produced, at least in part, from the passage of the third and fourth currents through the load;
generating second recharge and discharge currents that are proportional to the third and fourth output port voltages by the proportionality factor;

generating first and second fixed offset currents during the second and fourth time periods;

in the first discharge interval, discharging the capacitor using the first fixed offset current in addition to the first discharge current, the first fixed offset current being specified so as to discharge the capacitor to the initial voltage when summed with the first discharge current in the circumstance in which the load resistance equals the minimum acceptable resistance;

during a second recharge interval in the third time period, charging the capacitor from the initial voltage to a second intermediate voltage using the second recharge current;

during a second discharge interval in the fourth time period, discharging the capacitor from the intermediate voltage to a second final voltage using the second discharge current and the second fixed offset current, the second fixed offset current being specified so as to discharge the capacitor to the initial voltage when summed with the second discharge current in the circumstance in which the load resistance equals the maximum acceptable resistance;

in a second comparison, comparing the second final voltage to a second predetermined threshold voltage to determine whether the resistance of the load is greater than a maximum acceptable resistance; and preventing the voltage source from being coupled to the load in the event the first comparison indicates that the resistance of the load is less than the minimum acceptable resistance or greater than the maximum acceptable resistance.

26. The method of claim 25 wherein the fourth current is less than the third current.

27. The method of claim 25 wherein the first and second predetermined threshold voltages equal the initial voltage.

28. The method of claim 25 further including the step of coupling the voltage source to the load in the event the first comparison indicates that the resistance of the load is not less than the minimum acceptable resistance and the second comparison indicates that the resistance of the load is not greater than the maximum acceptable resistance.

29. The method of claim 25 wherein the beginning of the first recharge and discharge intervals are delayed from the beginning of the first and second time periods by respective first and second settling time periods, wherein the beginning of the second recharge and discharge intervals are delayed from the beginning of the third and fourth time periods by respective third and fourth settling time periods, and wherein the third and fourth settling time periods are greater than the first and second settling time periods.

30. The method of claim 29 wherein the first and second settling time periods are of the same duration and the third and fourth settling time periods are of the same duration.

31. The method of claim 29 wherein the third and fourth settling time periods are at least 1.2 times as long as the first and second settling time periods, respectively.

* * * * *